(12) United States Patent
Chassard

(10) Patent No.: US 10,214,165 B2
(45) Date of Patent: Feb. 26, 2019

(54) ELECTRICAL SUPPLY SYSTEM FOR A MOTOR VEHICLE, AND CORRESPONDING ELECTRONIC CONTROL MODULE

(71) Applicant: VALEO EQUIPEMENTS ELECTRIQUES MOTEUR, Creteil (FR)

(72) Inventor: Pierre Chassard, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 15/594,225

(22) PCT Filed: Nov. 16, 2015

(86) PCT No.: PCT/FR2015/053076
§ 371 (c)(1),
(2) Date: May 12, 2017

(87) PCT Pub. No.: WO2016/079401
PCT Pub. Date: May 26, 2016

(65) Prior Publication Data
US 2017/0259763 A1 Sep. 14, 2017

(30) Foreign Application Priority Data
Nov. 18, 2014 (FR) ..................................... 14 61094

(51) Int. Cl.
*B60R 16/023* (2006.01)
*H02J 1/00* (2006.01)
(Continued)

(52) U.S. Cl.
CPC .......... *B60R 16/0231* (2013.01); *B60R 16/03* (2013.01); *F02N 11/0866* (2013.01);
(Continued)

(58) Field of Classification Search
CPC ........ H02M 1/08; H02M 1/088; H02M 1/092; B60R 16/023; B60R 16/0231;
(Continued)

(56) References Cited

U.S. PATENT DOCUMENTS 5,406,091 A 4/1995 Burba et al.
6,861,767 B2 * 3/2005 Amano ............... F02N 11/0866
180/65.23
(Continued)

FOREIGN PATENT DOCUMENTS

EP 2574494 4/2013
FR 2838576 10/2003
(Continued)

*Primary Examiner* — Matthew Nguyen
(74) *Attorney, Agent, or Firm* — Berenato & White, LLC

(57) ABSTRACT

The electrical supply system according to the invention is of the type comprising, on the one hand, an electrical power network having a first voltage electrically connecting first items of equipment comprising an electrical motor/generator, an inverter/rectifier and a first electrical energy store, and, on the other hand, an electrical service network having a second voltage that is less than the first voltage electrically connecting second items of equipment comprising a second electrical energy store, an electronic control unit controlling the energy transfers between the power network and the service network by means of at least one reversible DC/DC converter The electronic unit comprises a first electronic module supplied by the power network exchanging information with the first items of equipment, and a second electronic module supplied by the service network exchanging information with the second items of equipment and electrically insulated from the first module.

17 Claims, 2 Drawing Sheets

(51) Int. Cl.
　　*H02J 7/34*　　　(2006.01)
　　*B60R 16/03*　　(2006.01)
　　*F02N 11/08*　　(2006.01)
　　*H04B 1/16*　　 (2006.01)

(52) U.S. Cl.
　　CPC　*H02J 1/00* (2013.01); *H02J 7/34* (2013.01); *H04B 1/1607* (2013.01); *F02N 2011/0888* (2013.01); *F02N 2011/0896* (2013.01); *H02J 2001/008* (2013.01)

(58) Field of Classification Search
　　CPC ...... B60R 16/03; F02N 11/08; F02N 11/0866; F02N 2011/0896; F02N 2011/0888; H04B 1/16; H04B 11/1607
　　See application file for complete search history.

(56) References Cited

U.S. PATENT DOCUMENTS

| | | | |
|---|---|---|---|
| 2005/0179412 | A1 | 8/2005 | Sebille |
| 2006/0058897 | A1* | 3/2006 | Senda .................. B60R 16/03 700/22 |
| 2013/0235631 | A1 | 9/2013 | Pahlevaninezhad et al. |
| 2015/0084413 | A1 | 3/2015 | Benchetrite et al. |
| 2017/0225635 | A1* | 8/2017 | Obayashi ................ F02B 39/10 |

FOREIGN PATENT DOCUMENTS

| | | |
|---|---|---|
| FR | 2988926 | 10/2013 |
| WO | WO2012047118 | 4/2012 |

\* cited by examiner

ELECTRICAL SUPPLY SYSTEM FOR A MOTOR VEHICLE, AND CORRESPONDING ELECTRONIC CONTROL MODULE

CROSS-REFERENCE TO RELATED APPLICATIONS AND CLAIM TO PRIORITY

This application is a national stage application of International Application No. PCT/FR2015/053076 filed Nov. 16, 2015, which claims priority to French Patent Application No. 1461094 filed Nov. 18, 2014, the disclosures of which are incorporated herein by reference and to which priority is claimed.

FIELD OF THE INVENTION

The present invention relates to an electrical supply system for a motor vehicle, as well as to an electronic control module to control this system.

BACKGROUND OF THE INVENTION

Motor vehicles with a thermal engine conventionally comprise an on-board electrical network comprising a battery, generally a 12 V battery, which is designed to supply the various items of equipment with electrical energy, in particular a starter, which is indispensable for ensuring the starting of the thermal engine. After the starting, an alternator which is coupled to the thermal engine ensures that the battery is charged with a rectifier.

Nowadays, the developments in power electronics make it possible to design an inverter/rectifier which supplies and controls a single reversible polyphase rotary electrical machine which advantageously replaces the starter and the alternator.

Initially, this machine, known as an alternator-starter, substantially had the purpose of fulfilling the functions of a generator and electric motor which were previously dedicated to the alternator and to the starter, and in addition to recuperate the braking energy, or to provide the thermal engine with additional power and torque.

For the purpose of increasing the power and improving the performance of the alternator-starter by increasing its operating voltage, whilst maintaining the possibility of using other standard equipment designed for a 12 V to 14 V supply, in particular the lead batteries, a so-called "14+X" or "micro-hybrid" architecture was developed, described for example in patent application FR2838576 by the company VALEO EQUIPEMENTS ELECTRIQUES MOTEUR.

This architecture thus consists of an electric power network which connects the alternator-starter to an electrical energy storage element which operates at a voltage higher than 14 V, and can reach 48 V, and of an electric service network which connects all the other items of equipment. The adaptation of the voltage levels between the two networks is ensured by a reversible direct/direct converter.

In a second stage, ecological considerations led to the design of reversible machines with power of approximately 8 to 16 kW, which is sufficient to drive the vehicle at low speed, for example in an urban environment.

Power levels of this type have been able to be obtained, whilst maintaining compact electrical machines, only by bringing the voltage of the electrical power network up to a value of approximately 60 V, which is far higher than the nominal voltage of conventional lead batteries, in a system described in particular in patent application FR2988926, also in the name of VALEO EQUIPEMENTS ELECTRIQUES MOTEUR.

In addition, power networks with voltages of up to 12 V can be implemented in an architecture which allows the vehicle to be driven at full speed by the electric motor )architecture of the so-called "full hybrid" type, in comparison with the previous so-called "mild-hybrid" architecture).

In an electrical supply system of this type, information needs to be exchanged between the two networks.

An electronic control unit is necessary in order to control the rectifier/inverter at the voltage of the electric power network, on the basis of information obtained from equipment at the voltage of the service network, in particular the control unit of the thermal engine in the mild-hybrid architecture. Conversely, information relating to the generator/starter must be transmitted to the equipment in the passenger space.

In an electrical supply system of this type, it is necessary to guarantee that at no time can a connection which is used for exchange of information be able to be used to exchange a power current.

SUMMARY OF THE INVENTION

The present invention relates to an electrical supply system of a motor vehicle which complies with the above-described constraints.

This electrical supply system is of the type which in itself is known, comprising:
- an electric power network with a first nominal voltage which connects electrically first items of equipment comprising a motor/electric generator, an inverter/rectifier, and a first electrical energy storage unit;
- an electric service network with a second nominal voltage, lower than the first nominal voltage, which connects electrically second items of equipment comprising a second electrical energy storage unit.

In this type of electrical supply system, an electronic control unit controls in a manner which in itself is known transfers of energy between the power network and the service network, by means of a reversible direct/direct converter.

The electronic control unit comprises a first electronic module supplied by the power network, which module exchanges information with the first items of equipment, and a second electronic module supplied by the service network, which module exchanges information with the second items of equipment, and is insulated electrically against the first module.

In the electrical supply system according to the invention, the first module and the second module exchange information on an electrically insulated communication channel.

According to a particular embodiment of the invention, this communication channel is two-way.

According to another particular embodiment of the invention, this communication channel is an optical communication channel.

The invention relates more particularly to an electrical supply system for a motor vehicle, wherein the first nominal voltage is substantially 48 V, and the second nominal voltage is substantially 12 V.

The invention also relates to an electronic control unit which can be integrated in an electrical supply system as previously described.

According to a characteristic of the invention, this electronic control unit comprises a first electronic module which is designed to be supplied with a first nominal voltage formed on a first flat substrate, and a second electronic module which is designed to be supplied with a second nominal voltage lower than this first nominal voltage, formed on a second flat substrate which is insulated electrically against the first substrate.

In the electronic control unit according to the invention, the first substrate is arranged opposite and parallel to the second substrate, and is separated by an intermediate layer formed by an electrically insulating material.

In a first embodiment of the electronic control unit according to the invention, at least one first light-emitting diode and at least one first photoreceptor are added onto the first substrate opposite openings in this intermediate layer, corresponding respectively to at least one second photoreceptor and at least one second light-emitting diode added onto the second substrate.

Alternatively, in a second embodiment of the electronic control unit according to the invention, at least one first light-emitting diode and at least one first photoreceptor are integrated in the first substrate opposite openings in this intermediate layer, corresponding respectively to at least one second photoreceptor and at least one second light-emitting diode integrated in the second substrate.

These few essential specifications will have made apparent to persons skilled in the art the advantages provided by the electrical supply system for a motor vehicle according to the invention, in comparison with the prior art.

The detailed specifications of the invention are given in the description which follows in association with the appended drawings. It should be noted that these drawings serve the purpose simply of illustrating the text of the description, and do not constitute in any way a limitation of the scope of the invention.

DETAILED DESCRIPTION OF THE PREFERRED EMBODIMENT(S)

Figure 1:
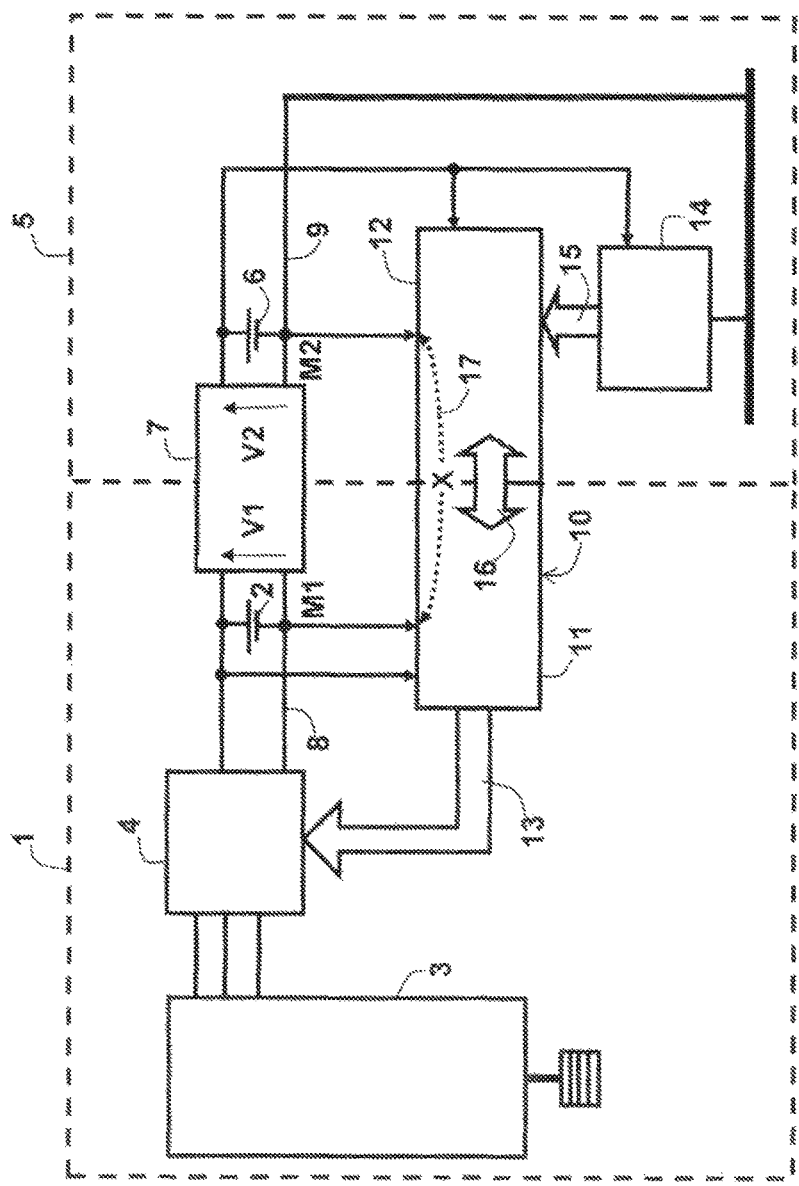
FIG. 1 is a wiring diagram of an electrical supply system for a motor vehicle according to the invention.

A reminder, in association with FIG. 1, of the characteristics of an electrical supply system for a motor vehicle known in the prior art in a so-called mild-hybrid architecture, will make it possible to understand well the contribution made by the invention.

FIG. 1 shows schematically an electric power network 1 comprising a first electrical energy storage unit 2 and an electric motor/generator 3.

Mostly, this motor/generator 3 is a three-phase machine comprising a rotor comprising an excitation winding and a stator comprising phase windings.

When the motor/generator 3 is in motor mode, an excitation circuit supplies an excitation current to the rotor, and a direct/alternating converter 4 operating as an inverter supplies the phase windings of the stator with power from the first electrical energy storage unit 2.

When the motor/generator 3 is in generator mode, the direct/alternating converter 4 operates as a synchronous rectifier, and the excitation circuit controls the charge voltage of the first electrical energy storage unit 2.

FIG. 1 also shows schematically an electric service network 5 comprising a second electrical energy storage unit 6.

In general, the first electrical energy storage unit 2 can be a high-capacity lithium-ion battery, with a high first nominal voltage V1, generally of 48 V or 60 V, and the second storage unit 6 can be a standard lead battery with a second nominal voltage V2 of 12 V.

As shown clearly in FIG. 1, the electric power network 1 and the electric service network 5 are connected to one another by a reversible direct/direct converter 7, which ensures the adaptation of the voltage levels V1, V2 and the electrical energy transfers between the two electrical networks 1, 5.

This converter 7 can be a cut-out semiconductor converter fitted with a "common earth" with the two batteries 2, 6, i.e. the two electrical networks 1, 5 have the same earth, or it can be an "insulated earth" converter, with the power network 1 then being connected to a first earth 8, and the service network 5 being connected to a second earth 9, which is insulated electrically against the first earth 8.

An electronic control unit 10 which controls the transfers of energy between the power network 1 and the service network 5 comprises a first electronic module 11 which is supplied by the power network 1, and a second electronic module 12 which is supplied by the electric service network 5.

In particular, the first module 11 transmits commands 13 to the rectifier/inverter 4 obtained from a control unit 14 of the thermal engine.

The commands 15 obtained from the engine control unit 14 are received by the second electronic module 12, and transmitted to the first electronic module 11 on a communication channel 16 which is insulated electrically in order to prevent passage of current 17 between these two modules 11, 12.

An optical communication channel 16 is used in order to guarantee a high insulation voltage of approximately several kilovolts.

Figure 2A:
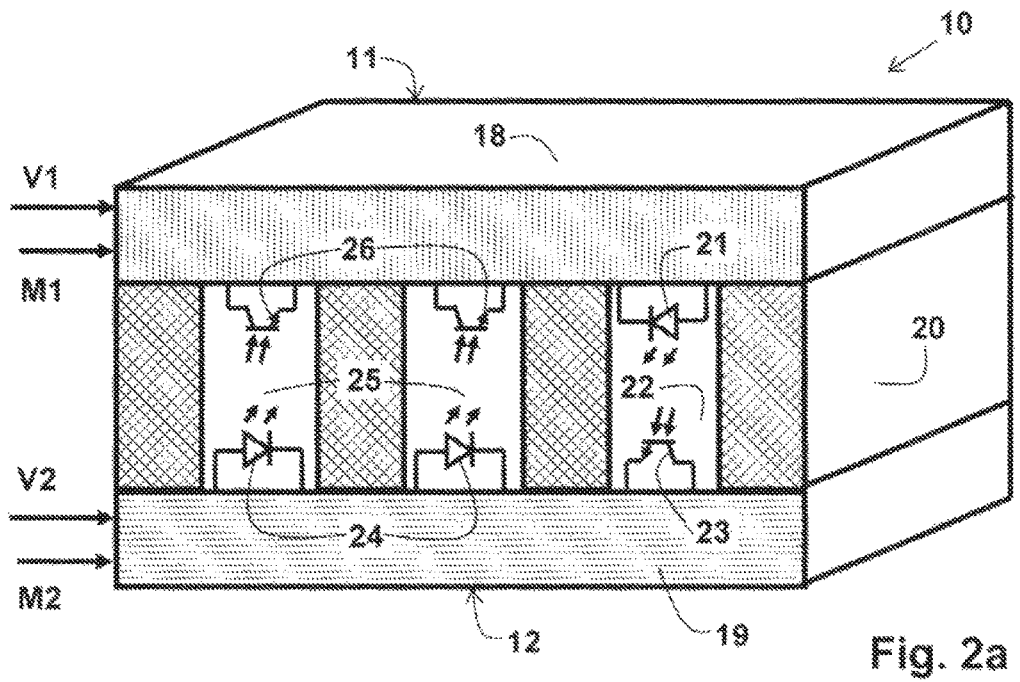
FIGS. 2a and 2b illustrate respectively first and second embodiments of an electronic control unit of the electrical supply system for a motor vehicle according to the invention shown in FIG. 1.

FIG. 2a shows a first preferred embodiment of the electronic control unit 10 implementing this optical communication channel 16, using integration in volume of modern microelectronic technologies.

The first electronic module 11 is formed on a first flat substrate 18, which extends opposite and parallel to a second flat substrate 19, on which the second electronic module 12 is formed.

The first and second substrates 18, 19 are separated by an intermediate layer 20 made of electrically insulating material.

As shown clearly in FIG. 2a, a light-emitting diode 21 is added onto the first substrate 18 opposite an opening 22 in the intermediate layer 20, such as to transmit a modulated flow of light to a photoreceptor 23 added onto the second substrate 19 at this opening 22.

Conversely, in order to ensure two-way communication, two other light-emitting diodes 24 are added onto the second substrate 19 opposite two other openings 25 in the intermediate layer 20, such as to transmit two other modulated flows of light to two other photoreceptors 26 added onto the first substrate 18 at these other openings 25.

Figure 2B:
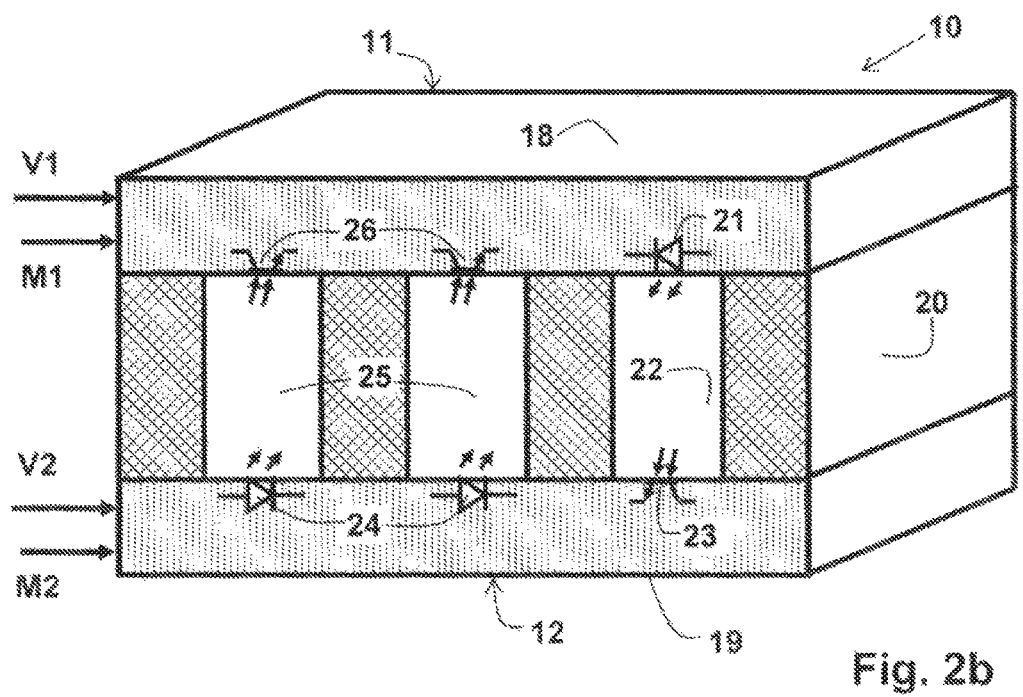

FIG. 2b shows a second preferred embodiment of the electronic control unit 10 which implements this optical communication channel 16, wherein the light-emitting diodes 21, 24 and the photoreceptors 23, 26 are integrated in the substrates 18, 19 themselves.

When produced in this way, the electronic control unit 10 can be supplied with both the first nominal voltage V1 of the power network 1, and the second nominal voltage V2 of the service network, in order to ensure the exchange of information between the items of equipment connected to these two networks 1, 5, without the possibility of passage of current 17 via the unit 10.

It will be appreciated that the invention is not limited simply to the above-described preferred embodiments.

A similar description could apply to galvanic means for insulation between the first and second electronic modules 11, 12 of the electronic control unit 10 other than optical couplers formed by the light-emitting diode 21, 24/photoreceptor 23, 26 pairs described, for example it could apply to capacitive or inductive coupling devices, such as insulation transformers.

The number indicated of optical couplers 21, 24; 23, 26 represented is also given only by way of example. Persons skilled in the art will adapt this number according to the capacity required for the optical communication channel 16.

As an alternative to a lithium-iron battery with a first nominal voltage V1 of 48 V, the first electrical energy storage unit 2 can be a 60 V lithium-ion battery, or a high-temperature molten-salts battery of the "Zebra" (sodium/nickel chloride) type, or, if the energy level required is low, an ultra-capacitor of the EDLC (Electric Double Layer Capacitor) type.

Similarly, as an alternative to a standard lead battery, the second type of electrical energy storage unit 6 can be a nickel-zinc battery or an NiMH battery, for example.

As an alternative to a polyphase machine with excitation, the motor/generator 3 is also a machine with permanent magnets, or also a hybrid machine.

The invention thus incorporates all the possible variant embodiments suitable for the characteristics of the equipment connected to the power network 1 and to the service network 5, provided that these variants remain within the context defined by the following claims.

The invention claimed is:

1. An electrical supply system for a motor vehicle, comprising:
   an electric power network (1) with a first nominal voltage (V1) which connects electrically first items of equipment comprising an electric motor/generator (3), an inverter/rectifier (4), and a first electrical energy storage unit (2); and
   an electric service network (5) with a second nominal voltage (V2) lower than said first nominal voltage (V1), which connects electrically second items of equipment comprising a second electrical energy storage unit (6), an electronic control unit (10) which controls transfers of energy between said power network (1) and said service network (5), by a reversible DC/DC converter (7), wherein said electronic control unit (10) comprises a first electronic module (11) supplied by said power network (1), which module exchanges information (13, 15) with said first items of equipment, and a second electronic module (12) supplied by said service network (5), which module exchanges said information (13, 15) with said second items of equipment, and is insulated electrically against said first module (11).

2. The electrical supply system according to claim 1, wherein said first module (11) and said second module (12) exchange said information (13, 15) on an electrically insulated communication channel (16).

3. The electrical supply system according to claim 2, wherein said communication channel (16) is two-way.

4. The electrical supply system according claim 3, wherein said communication channel (16) is an optical communication channel.

5. The electrical supply system according to claim 3, wherein said first nominal voltage (V1) is substantially 48 V, and said second nominal voltage (V2) is substantially 12 V.

6. An electronic control unit (10) which can be integrated in an electrical supply system for a motor vehicle according to claim 3, comprising a first electronic module (11) which is designed to be supplied with a first nominal voltage (V1) formed on a first flat substrate (18), and a second electronic module (12) which is designed to be supplied with a second nominal voltage (V2) lower than said first nominal voltage (V1), formed on a second flat substrate (19) which is insulated electrically against said first substrate (18).

7. The electrical supply system according to claim 2, wherein said communication channel (16) is an optical communication channel.

8. The electrical supply system according to claim 7, wherein said first nominal voltage (V1) is substantially 48 V, and said second nominal voltage (V2) is substantially 12 V.

9. An electronic control unit (10) which can be integrated in an electrical supply system for a motor vehicle according to claim 7, comprising said first electronic module (11) designed to be supplied with said first nominal voltage (V1) formed on a first flat substrate (18), and said second electronic module (12) designed to be supplied with said second nominal voltage (V2) lower than said first nominal voltage (V1), formed on a second flat substrate (19) insulated electrically against said first substrate (18).

10. The electrical supply system according to claim 2, wherein said first nominal voltage (V1) is substantially 48 V, and said second nominal voltage (V2) is substantially 12 V.

11. An electronic control unit (10) which can be integrated in an electrical supply system for a motor vehicle according to claim 2, comprising said first electronic module (11) designed to be supplied with said first nominal voltage (V1) formed on a first flat substrate (18), and said second electronic module (12) designed to be supplied with said second nominal voltage (V2) lower than said first nominal voltage (V1), formed on a second flat substrate (19) insulated electrically against said first substrate (18).

12. The electrical supply system according to claim 1, wherein said first nominal voltage (V1) is substantially 48 V, and said second nominal voltage (V2) is substantially 12 V.

13. An electronic control unit (10) which can be integrated in an electrical supply system for a motor vehicle according to claim 12, comprising said first electronic module (11) designed to be supplied with said first nominal voltage (V1) formed on a first flat substrate (18), and said second electronic module (12) designed to be supplied with said second nominal voltage (V2) lower than said first nominal voltage (V1), formed on a second flat substrate (19) insulated electrically against said first substrate (18).

14. An electronic control unit (10) which can be integrated in an electrical supply system for a motor vehicle according to claim 1, comprising said first electronic module (11) designed to be supplied with said first nominal voltage (V1) formed on a first flat substrate (18), and said second electronic module (12) designed to be supplied with said second nominal voltage (V2) lower than said first nominal voltage (V1), formed on a second flat substrate (19) insulated electrically against said first substrate (18).

15. The electronic control unit (10) according to claim 14, wherein said first substrate (18) is arranged opposite and parallel to said second substrate (19), and is separated by an intermediate layer (20) formed by an electrically insulating material.

16. The electronic control unit according to claim 15, wherein at least one first light-emitting diode (21) and at least one first photoreceptor (26) are added onto said first substrate (18) opposite openings (22, 25) in said intermediate layer (20), corresponding respectively to at least one second photoreceptor (23) and at least one second light-emitting diode (24) added onto said second substrate (19).

17. The electronic control unit (10) according to claim 15, wherein at least one first light-emitting diode (21) and at least one first photoreceptor (26) are integrated in said first substrate (18) opposite openings (22, 25) in said intermediate layer (20), corresponding respectively to at least one second photoreceptor (23) and at least one second light-emitting diode (24) integrated in said second substrate (19).

\* \* \* \* \*